United States Patent
Ono et al.

(10) Patent No.: US 10,386,815 B2
(45) Date of Patent: Aug. 20, 2019

(54) MACHINING MANAGEMENT APPARATUS

(71) Applicant: DMG MORI CO., LTD., Nara (JP)

(72) Inventors: Katsuhiko Ono, Nara (JP); Shizuo Nishikawa, Nara (JP); Masataka Sakamoto, Nara (JP); Kengo Kawai, Nara (JP)

(73) Assignee: DMG MORI CO., LTD., Nara (JP)

( * ) Notice: Subject to any disclaimer, the term of this patent is extended or adjusted under 35 U.S.C. 154(b) by 213 days.

(21) Appl. No.: 15/608,360

(22) Filed: May 30, 2017

(65) Prior Publication Data

US 2017/0364056 A1 Dec. 21, 2017

(30) Foreign Application Priority Data

Jun. 20, 2016 (JP) .................. 2016-121395

(51) Int. Cl.
| | |
|---|---|
| *G06F 16/48* | (2019.01) |
| *G06F 16/23* | (2019.01) |
| *G05B 19/40* | (2006.01) |
| *G05B 19/4065* | (2006.01) |
| *G05B 19/41* | (2006.01) |
| *B23Q 17/09* | (2006.01) |

(52) U.S. Cl.
CPC ......... *G05B 19/4065* (2013.01); *G06F 16/23* (2019.01); *G06F 16/489* (2019.01); *G05B 2219/37249* (2013.01)

(58) Field of Classification Search
CPC ............ G05B 19/4065; G05B 19/4163; B23Q 17/0952

USPC ........................................................ 700/175
See application file for complete search history.

(56) References Cited

U.S. PATENT DOCUMENTS

| | | | |
|---|---|---|---|
| 2014/0186127 A1* | 7/2014 | Parker | B23B 29/12 407/7 |
| 2016/0161939 A1* | 6/2016 | Susnjara | G05B 19/4065 700/169 |
| 2018/0080305 A1* | 3/2018 | Jacks | G05B 19/02 |

FOREIGN PATENT DOCUMENTS

JP 2007021656 A 1/2007

* cited by examiner

*Primary Examiner* — Michael J Brown
(74) *Attorney, Agent, or Firm* — Miller, Matthias & Hull LLP

(57) ABSTRACT

A machining management apparatus includes a tool information storage storing therein information relating to each cutting tool used in a machine tool and storing therein a coefficient n and a coefficient C in a tool life equation corresponding to tool life influencing factors including at least a workpiece and a cutting tool material, and an adapted cutting speed calculator executing a machining condition receiving processing of receiving information on the tool life influencing factors and information on a desired cutting speed, a coefficient recognition processing of recognizing the coefficient n and the coefficient C corresponding to the tool life influencing factors by referring to the tool information storage based on the received tool life influencing factor information, and a cutting speed calculation processing of calculating a cutting speed adapted to the desired cutting time according to the tool life equation based on the recognized coefficient n and coefficient C.

14 Claims, 5 Drawing Sheets

F I G. 2

| Tool Type | Tool Material | Workpiece Material | Width of Cut [mm] | Standard Cutting Speed [m/min] | Standard Tool Life Time [min] | Hue of Chips | Correction Coefficient | Coefficient n | Coefficient C |
|---|---|---|---|---|---|---|---|---|---|
| K1 | Coating | S45C | 4 | 100 | 20 | 70 | 0.9 | 0.4 | 500 |
| K1 | Coating | FC250 | 4 | 100 | 30 | 55 | 0.9 | 0.4 | 800 |
| K2 | P10 | SS4000 | 4 | 85 | 25 | 60 | 1.1 | 0.3 | 800 |
| ... | ... | ... | ... | ... | ... | ... | ... | ... | ... |

| Tool No. | Tool Type | Remaining Life Rate |
|---|---|---|
| 1 | K1 | 0.3 |
| 2 | K2 | 0.7 |
| 3 | K1 | 1.0 |
| ⋮ | ⋮ | ⋮ |

| Data No. | Cutting Speed V[m/min] | Used Time T[min] |
|---|---|---|
| 1 | 300 | 13.1 |
|   | 360 | 7.2 |
| 2 | 300 | 7.9 |
|   | 360 | 7.2 |
|   | 400 | 2 |

MACHINING MANAGEMENT APPARATUS

BACKGROUND

Field of the Disclosure

The present disclosure relates to a machining management apparatus that derives cutting conditions taking into account tool lives of cutting tools used in a machine tool and manages the tool lives of the cutting tools.

Background of the Disclosure

In machining a workpiece with a cutting tool, a cutting edge of the cutting tool gradually wears, and therefore surface accuracy of a machined surface gradually deteriorates as a function of the degree of the wear and it gradually becomes impossible to obtain a stable dimension accuracy. Further, when the surface accuracy of the machined surface deteriorates over its limit or the dimension accuracy becomes unstable over its limit, the operator judges that the cutting tool has reached the end of its tool life, and replaces the cutting tool with a new one and then continues the machining.

Other than the above-mentioned surface accuracy of the machined surface and dimension accuracy, the tool life judgement can be made based on a load acting on the machine tool in cutting, a cutting sound, or the like. However, in each case, the tool life judgement largely depends on the operator's sense that the operator has acquired through years of experience, and therefore there is a problem that the judgement cannot be quantitatively made. Therefore, if the operator makes a wrong judgement and continuously uses a cutting tool which has already reached the end of its tool life, a cutting edge of the cutting tool can be broken and thereby the workpiece or the cutting tool itself can be damaged. Further, if a mechanical load exceeds its limit, the machine tool could be damaged. Therefore, typically, the operator pays attention to the machine tool at all times, and replaces each tool with a new one somewhat in advance before it reaches the end of its true tool life, in order to avoid danger.

Accordingly, there has been proposed a tool life management apparatus configured to accumulating, based on an NC program executed in a machine tool, the number of times each cutting tool was used by execution of the NC program, and, for a cutting tool the cumulative number of uses of which has exceeded a previously set maximum value, judging that the cutting tool has reached the end of its tool life (see Japanese Unexamined Patent Application Publication No. 2007-21656).

According to this tool life management apparatus, the tool life judgment can be made quantitatively without depending on the operator's sense; therefore, it is possible to make a steady, consistent judgment.

SUMMARY OF THE DISCLOSURE

By the way, in the field of modern cutting using a machine tool, it is always desired to improve machining efficiency, and in view of improvement of machining efficiency, high-efficiency cutting that machines a workpiece at a high cutting speed is desired. In such machining at a high cutting speed, it is considered that a tool life of the cutting tool is subject to diffusional wear that depends on the temperature of a cutting edge of the cutting tool in cutting, and it is considered that the following equation holds between the tool life T and the cutting edge temperature $\theta$:

$$\theta \cdot T^{nt} = Ct,$$

where nt and Ct are constants depending on the tool material and the workpiece (material).

Further, it is known that a cutting temperature $\theta$ and a cutting speed V have the following relationship:

$$\theta \propto V^m,$$

where m is an influence coefficient of the cutting speed V on the cutting temperature $\theta$.

Further, the following equation is derived from the above-described relational equation between tool life T and cutting edge temperature $\theta$ and relational equation between cutting temperature $\theta$ and cutting speed V:

$$V \cdot T^n = C,$$

where n and C are coefficients depending on the tool material and the workpiece (material). This equation is known as Taylor's tool life equation.

As understood from this tool life equation, a tool life depends on a cutting speed and there is a suitable cutting speed for obtaining a desired tool life time. Therefore, if it is desired to perform a continuous machining while avoiding tool replacement as much as possible in order to minimize costs for tools or to prevent the machining time from being lengthened by tool replacement, it is necessary to recognize a cutting speed corresponding to such a machining time (machining time until reaching the end of the tool life).

Further, as understood from the relational equation between tool life T and cutting edge temperature $\theta$, a tool life of a cutting tool depends on the tool material and the workpiece to be cut. Therefore, in order to quantitatively and accurately judge a tool life of a cutting tool, it is necessary to make judgment taking into account at least the tool material and the workpiece.

However, in the above-described conventional tool life management apparatus, the tool material and the workpiece are not taken into account at all. Therefore, the apparatus cannot accurately judge a tool life of a cutting tool.

The present disclosure has been achieved in view of the above-described circumstances, and an object thereof is to provide a machining management apparatus capable of deriving a cutting speed which can provide a desired machining time, and another object thereof is to provide a machining management apparatus capable of making an accurate tool life judgement taking into account at least a tool material and a workpiece to be cut.

The present disclosure, for achieving the above-mentioned objects, relates to machining management apparatuses which are implemented in modes described below.

(First Mode)

A machining management apparatus according to a first mode, including:

a tool information storage storing therein information relating to each of cutting tools used in a machine tool, the tool information storage storing therein a coefficient n and a coefficient C in a tool life equation below corresponding to tool life influencing factors including at least a workpiece to be cut and a material of the cutting tool; and an adapted cutting speed calculator executing a machining condition receiving processing of receiving, as freely set machining conditions, information on the tool life influencing factors and information on a desired cutting time, a coefficient recognition processing of recognizing the coefficient n and the coefficient C corresponding to the received tool life influencing factors by referring to the tool information storage based on the received information on the tool life influencing factors, and a cutting speed calculation processing of calculating a cutting speed adapted to the desired cutting time according to the tool life equation below based on the recognized coefficient n and coefficient C:

$$V \cdot T^n = C,$$

where V is a cutting speed, T is a tool life time, and n and C are coefficients.

In this machining management apparatus, the coefficient n and the coefficient C of the above equation, which is the above-described Taylor's tool life equation, corresponding to tool life influencing factors including at least a workpiece to be cut and a cutting tool material are stored in association with the corresponding tool life influencing factors in the tool information storage. The coefficient n and the coefficient C corresponding to the tool life influencing factors are previously obtained in an empirical manner, such as though trial machining or the like, and previously obtained and stored into the tool information storage for at least each workpiece having a possibility of being machined in the machine tool and each tool (tool material) used in the machine tool.

When information on the tool life influencing factors including at least the workpiece to be cut and the cutting tool material and information on a desired cutting time, which are freely set machining conditions, are input into the adapted cutting speed calculator, the adapted cutting speed calculator executes the machining condition receiving processing of receiving the input information on the tool life influencing factors and information on the desired cutting time, and then executes the coefficient recognition processing of recognizing the coefficient n and the coefficient C corresponding to the received tool life influencing factors by referring to the tool information storage based on the received information on the tool life influencing factors.

Based on the recognized coefficient n and coefficient C, the adapted cutting speed calculator executes the cutting speed calculation processing of calculating a cutting speed adapted to the desired cutting time according to the above tool life equation, that is, by the following equation:

$$V_a = C/T_a^n,$$

where $T_a$ is the desired cutting time and $V_a$ is the cutting speed adapted to the desired cutting time.

As described above, with this machining management apparatus, when machining a predetermined workpiece with a predetermined cutting tool, the operator can obtain information on a cutting speed adapted to a desired cutting time by inputting information on the tool life influencing factors that includes at least information on the workpiece and the material of the cutting tool, and information on the desired cutting time. Therefore, when desiring to perform a continuous machining while avoiding tool replacement as much as possible in order to minimize costs for tools or to prevent the machining time from being lengthened by tool replacement, the operator can easily obtain a cutting speed corresponding to such a cutting time (cutting time until reaching the end of the tool life of the cutting tool).

Note that, in this first mode, the tool life influencing factors, as described above, include at least the workpiece to be cut and the cutting tool material; however, as a matter of course, the tool life influencing factors may include other factors.

(Second Mode)

A machining management apparatus according to a second mode is such that, in the machining management apparatus according to the first mode, the tool information storage is configured to store therein the coefficient n and the coefficient C corresponding to tool life influencing factors including the workpiece to be cut, the material of the cutting tool, and at least any one of a feed amount of the cutting tool, a width of cut, and a depth of cut, and the adapted cutting speed calculator is configured to, in the machining condition receiving processing, receive, as freely set machining conditions, information on the tool life influencing factors and information on a desired cutting time, and, in the coefficient recognition processing, recognize the coefficient n and the coefficient C corresponding to the received tool life influencing factors by referring to the tool information storage based on the received information on the tool life influencing factors.

The temperature of a cutting edge of a cutting tool in cutting varies in accordance with a width of cut, for example because, in the case where the cutting tool is an end mill, there is a racing time. Therefore, the state of wear of the cutting tool varies in accordance with the width of cut even if machining is performed with the same workpiece and the same cutting tool; consequently, the time until the cutting tool reaches the end of its tool life varies. Further, the state of wear of the cutting tool varies to no small extent also in accordance with a feed amount of the cutting tool or a depth of cut; consequently, the time until the cutting tool reaches the end of its tool life varies.

Accordingly, the coefficient n and the coefficient C corresponding to tool life influencing factors including the workpiece to be cut, the material of the cutting tool, and at least any one of a feed amount of the cutting tool, a width of cut, and a depth of cut are stored in the tool information storage. In the adapted cutting speed calculator, a cutting time adapted to the desired cutting time is calculated based on the coefficient n and the coefficient C corresponding to these tool life influencing factors, whereby a suitable cutting speed which allows the desired cutting time to be within an accurate tool life time that takes into account the feed amount of the cutting tool, the width of cut, or the depth of cut can be derived.

Note that, in this second mode, the tool life influencing factors, as described above, include the workpiece to be cut, the cutting tool material, and at least any one of the cutting tool feed amount, the width of cut, and the depth of cut; however, as a matter of course, the tool life influencing factors may include other factors.

(Third Mode)

A machining management apparatus according to a third mode is such that, in the machining management apparatus according to the first mode or the second mode, the tool information storage is configured to further store therein a correction coefficient for tool life set for each of the cutting tools, and the adapted cutting speed calculator is configured to, in the coefficient recognition processing, further recognize the correction coefficient for a corresponding cutting tool from the tool information storage, and, in the cutting speed calculation processing, calculate a cutting speed adapted to the desired cutting time according to the tool life equation based on the recognized coefficient n, coefficient C and correction coefficient.

In the thus-configured machining management apparatus, in the adapted cutting speed calculator, the desired cutting time is corrected with the correction coefficient stored in the tool information storage and, based on the corrected desired cutting time, a cutting speed adapted thereto is calculated. For example, the adapted cutting speed $V_a$ is calculated by the following equation:

$$V_a = C/(T_a \cdot k)^n,$$

where $T_a$ is the desired cutting time, $V_a$ is the cutting speed adapted to the desired cutting time $T_a$, and k is the correction coefficient that is freely set.

In judging a tool life of a cutting tool, in the case where machining is performed with a predetermined workpiece and a predetermined cutting tool or with a predetermined workpiece, a predetermined cutting tool, and a predetermined feed amount, width of cut, or depth of cut, the operator may judge that the time until judging that the cutting tool has reached the end of its tool life can be slightly extended or that the time should be slightly shortened, based on his experiential knowledge. Therefore, in order to flexibly respond to such operator's judgment, the desired cutting time, that is, a cutting time until judging that the cutting tool has reached the end of its tool life, is corrected with the above-described correction coefficient.

(Fourth Mode)

A machining management apparatus according to a fourth mode, including:

a tool information storage storing therein information relating to each of cutting tools used in a machine tool, the tool information storage storing therein a coefficient n and a coefficient C in a tool life equation below corresponding to tool life influencing factors including at least a workpiece to be cut and a material of the cutting tool;

a remaining life information storage storing therein information on a remaining life of each of the cutting tools; and a remaining life update part configured to execute an initial value setting processing of receiving information indicating that each cutting tool is new, and setting the information on the remaining life of the cutting tool stored in the remaining life information storage to an initial value, and execute a coefficient recognition processing of recognizing information on the tool life influencing factors in actual cutting performed in the machine tool and recognizing information on an actual cutting speed and an actual cutting time under the actual cutting speed in the actual cutting, and recognizing the coefficient n and the coefficient C corresponding to the recognized tool life influencing factors by referring to the tool information storage based on the recognized information on the tool life influencing factors, and an update processing of recognizing a rate of tool life consumption by the actual cutting for each of corresponding cutting tools based on the recognized actual cutting speed, actual cutting time, coefficient n, and coefficient C for the cutting tool and updating the information on the remaining life of each of the corresponding cutting tools stored in the remaining life information storage based on the recognized rate of tool life consumption of the cutting tool;

$$V \cdot T^n = C,$$

where V is a cutting speed, T is a tool life time, and n and C are coefficients.

In this machining management apparatus, similarly to the above, the coefficient n and the coefficient C of the above-described Taylor's tool life equation corresponding to tool life influencing factors including at least a workpiece to be cut and a cutting tool material are stored in association with the corresponding tool life influencing factors in the tool information storage. The coefficient n and the coefficient C corresponding to the tool life influencing factors are previously obtained in an empirical manner, such as though trial machining or the like, and previously obtained and stored into the tool information storage for at least each workpiece having a possibility of being machined in the machine tool and each tool (tool material) used in the machine tool.

Further, information on a remaining life of each of the cutting tools is stored in the remaining life information storage. The remaining life information of each cutting tool is information indicating the remaining life of the cutting tool, and can be numerically expressed, for example, such that the remaining life is "1.0" when the cutting tool is new, tool life consumptions by actual cutting are sequentially subtracted therefrom, and the remaining life becomes "0" when the cutting tool reaches the end of its tool life. Accordingly, in this case, the information indicating the remaining life of each cutting tool can be considered as a "remaining life rate" of the cutting tool and the tool life consumption can be considered as a "tool life consumption rate" (or "remaining life consumption rate").

The remaining life information update part executes the initial value setting processing of receiving information indicating that each cutting tool is new, and setting the remaining life information of the cutting tool stored in the remaining life information storage to an initial value. The information indicating that each cutting tool is new is, for example, externally input by the operator.

Further, the remaining life information update part recognizes information on the tool life influencing factors in actual cutting performed in the machine tool and recognizes an actual cutting speed and a cutting time under the actual cutting speed in the actual cutting, and recognizes the coefficient n and the coefficient C corresponding to the recognized tool life influencing factors by referring to the tool information storage based on the recognized information on the tool life influencing factors (coefficient recognition processing).

Note that the remaining life information update part can recognize the information on the tool life influencing factors in actual cutting (that is, information including at least the workpiece to be cut and the materials of the cutting tools), for example, by receiving external inputs made by the operator, or by receiving information on the tool life influencing factors interpreted from codes contained in an NC program for the cutting from an NC device that executes the NC program. Further, the remaining life information update part can recognize the actual cutting speed and the actual cutting time under the actual cutting speed by receiving information thereon from the NC device that executes the NC program.

Subsequently, the remaining life update part executes the update processing of recognizing a rate of tool life consumption by the actual cutting for each of corresponding cutting tools based on the recognized actual cutting speed, actual cutting time, coefficient n, and coefficient C for the cutting tool, and updating the remaining life information of each of the corresponding cutting tools stored in the remaining life information storage based on the recognized rate of tool life consumption of the cutting tool.

For example, when machining is performed for t minutes at a cutting speed $V_1$, if a tool life time for the case where machining is performed at the cutting speed $V_1$ is $T_1$, the rate of tool life consumption (tool life consumption rate) by actual cutting of the corresponding cutting tool is represented by $t/T_1$. The remaining life information update part updates the remaining life information stored in the remaining life information storage with the thus-calculated tool life consumption rate, that is, updates the remaining life rate by subtracting the tool life consumption rate from the remaining life rate stored in the remaining life information storage Thus, according to this machining management apparatus, the operator can recognize the remaining tool life of each cutting tool by checking the remaining life information stored in the remaining life information storage. Therefore, the operator can previously prepare for tool replacement or the like in accordance with the state of the remaining life of each cutting tool and therefore can promptly take an action. Further, the operator can quantitatively recognize whether each cutting tool has reached the end of its tool life.

Note that, in this fourth mode, the tool life influencing factors, as described above, include at least the workpiece to be cut and the cutting tool material; however, as a matter of course, the tool life influencing factors may include other factors.

(Fifth Mode)

A machining management apparatus according to a fifth mode is such that, in the machining management apparatus according to the fourth mode, the tool information storage is configured to store therein the coefficient n and the coefficient C corresponding to tool life influencing factors including the workpiece to be cut, the material of the cutting tool, and at least any one of a feed amount of the cutting tool, a width of cut, and a depth of cut, and the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the coefficient n and the coefficient C corresponding to the recognized tool life influencing factors by referring to the tool information storage based on the recognized information on the tool life influencing factors.

As described above, the temperature of a cutting edge of a cutting tool in cutting varies in accordance with a width of cut, for example because, in the case where the cutting tool is an end mill, there is a racing time. Therefore, the state of wear of the cutting tool varies in accordance with the width of cut even if machining is performed with the same workpiece and the same cutting tool; consequently, the time until the cutting tool reaches the end of its tool life varies. Further, the state of wear of the cutting tool varies to no small extent also in accordance with a feed amount of the cutting tool or a depth of cut; consequently the time until the cutting tool reaches the end of its tool life varies.

Accordingly, the coefficient n and the coefficient C corresponding to tool life influencing factors including the workpiece to be cut, the material of the cutting tool, and at least any one of a feed amount of the cutting tool, a width of cut, and a depth of cut are stored in the tool information storage. In the remaining life information update part, in the coefficient recognition processing, information on the tool life influencing factors, an actual cutting speed, and an actual cutting time under the actual cutting speed in actual cutting performed in the machine tool are recognized, and the coefficient n and the coefficient C corresponding to the recognized tool life influencing factors are recognized by referring to the tool information storage based on the recognized information on the tool life influencing factors. Note that the remaining life information update part can recognize the feed of amount of the cutting tool, the width of cut, or the depth of cut by receiving external inputs made by the operator, or by receiving a feed of amount, a width of cut, or a depth of cut interpreted from codes contained in an NC program for the cutting from an NC device that executes the NC program.

With this configuration, in the remaining life information update part, a more accurate tool life consumption rate is calculated using the coefficient n and the coefficient C corresponding to the tool life influencing factors, and the remaining life information stored in the remaining life information storage is updated to more accurate information. Therefore, the operator can recognize a more accurate remaining life for each cutting tool.

Note that, in this fifth embodiment, the tool life influencing factors, as described above, include the workpiece to be cut, the cutting tool material, and at least any one of the cutting tool feed amount, the width of cut, and the depth of cut; however, as a matter of course, the tool life influencing factors may include other factors.

(Sixth Mode)

A machining management apparatus according to a sixth mode is such that, in the machining management apparatus according to the fourth mode, the tool information storage is configured to store therein at least a standard cutting speed, a standard tool life time, the coefficient n, and the coefficient C corresponding to the tool life influencing factors, and the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the standard cutting speed, the standard tool life time, and the coefficient n corresponding to the recognized tool life influencing factors by referring to the tool information storage based on the recognized information on the tool life influencing factors, and, in the update processing, recognize a rate of tool life consumption by the actual cutting for each of corresponding cutting tools based on the recognized actual cutting speed, actual cutting time, standard cutting speed, standard tool life time, and coefficient n for the cutting tool, and update the information on the remaining life of each of the corresponding cutting tools stored in the remaining life information storage based on the recognized rate for tool life consumption of the cutting tool.

Note that the standard cutting speed and the standard tool life time corresponding to the tool life influencing factors are, for example, provided by the manufacturer of the cutting tool; the standard cutting speed is a recommended cutting speed for the cutting tool and the standard tool life time is a tool life time of the cutting tool for the case where machining is performed at the standard cutting speed.

In the thus-configured machining management apparatus, in the update processing in the remaining life information update part, a rate of tool life consumption by actual cutting of each of corresponding cutting tools is recognized based on the actual cutting speed, actual cutting time, standard cutting speed, standard tool life time, and coefficient n for the cutting tool.

In this connection, based on the above-mentioned Taylor's tool life equation, the following equation holds:

$$V_1 \cdot T_1^n = V_s \cdot T_s^n = C,$$

where $V_s$ is the standard cutting speed, $T_s$ is the standard tool life time for the case where machining is performed at the standard cutting speed $V_s$, and $T_1$ is a tool life time for the case where machining is performed at a certain cutting speed $V_1$.

By transforming the above equation, the tool life time $T_1$ for the case where machining is performed at the cutting speed $V_1$ can be represented by the following equation:

$$T_1 = T_s \cdot (V_s/V_1)^{1/n}.$$

Thus, in the case where the standard cutting speed $V_s$ and the standard tool life time $T_s$ are known, even if the coefficient C is not known, the tool life time can be calculated by using the standard cutting speed $V_s$, the standard tool life time $T_s$, and the coefficient n, and the tool life consumption rate can be calculated using the calculated tool life time.

Note that, when the actual cutting time is t, the tool life consumption rate $t/T_1$ is $$t/T = t/(T_s \cdot (V_s/V_1)^{1/n}).$$

(Seventh Mode)

A machining management apparatus according to a seventh mode is such that, in the machining management apparatus according to the fifth mode, the tool information storage is configured to store therein at least a standard cutting speed, a standard tool life time, the coefficient n, and the coefficient C corresponding to the tool life influencing factors, and the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the standard cutting speed, the standard tool life time, and the coefficient n corresponding to the recognized tool life influencing factors by referring to the tool information storage based on the recognized information on the tool life influencing factors, and, in the update processing, recognize a rate of tool life consumption by the actual cutting for each of corresponding cutting tools based on the recognized actual cutting speed, actual cutting time, standard cutting speed, standard tool life time, and coefficient n for the cutting tool, and update the information on the remaining life of each of the corresponding cutting tools stored in the remaining life information storage based on the recognized rate of tool life consumption of the cutting tool.

In this machining management apparatus, in the case where the state of wear of a cutting tool varies in accordance with the cutting tool feed amount, the width of cut, or the depth of cut, more accurate remaining life information taking it into account can be obtained. Further, similarly to the sixth mode, in the update processing in the remaining life information update part, a tool life consumption rate of each of corresponding cutting tools is calculated based on the actual cutting speed, actual cutting time, standard cutting speed, standard tool life time, and coefficient n for the cutting tool. Therefore, even when the coefficient C is not known, the tool life time can be calculated by using the standard cutting speed, the standard tool life time, and the coefficient n, and the tool life consumption rate can be calculated using the calculated tool life time.

(Eighth Mode)

A machining management apparatus according to an eighth mode is such that the machining management apparatus according to the fourth mode or the fifth mode further includes a temperature information detector for obtaining information on a cutting temperature in cutting a workpiece with each of the cutting tools, the tool information storage is configured to further store therein the information on the cutting temperature corresponding to the coefficient n and the coefficient C, and the remaining life information update part is configured to, in the coefficient recognition processing, in the case where the coefficient n and the coefficient C corresponding to the actual cutting are not stored in the tool information storage, estimate the coefficient n and the coefficient C corresponding to the actual cutting by referring to the tool information storage based on the information on the cutting temperature obtained by the temperature information detector, and execute the update processing using the estimated coefficient n and coefficient C.

In this machining management apparatus, for example, in the case where data on the coefficient n and the coefficient C corresponding to the tool life influencing factors in actual cutting are not stored in the tool information storage, the remaining life information update part, in the coefficient recognition processing, refers to the tool information storage based on cutting temperature information obtained by the temperature information detector to recognize the coefficient n and the coefficient C corresponding to the same cutting temperature as the cutting temperature information or the coefficient n and the coefficient C corresponding to a cutting temperature approximating to the cutting temperature information, and estimates the coefficient n and the coefficient C corresponding to the actual cutting at the recognized coefficient n and coefficient C. Subsequently, the remaining life information update part executes the above-described update processing using the estimated coefficient n and coefficient C. Thus, according to this machining management apparatus, even when data on the coefficient n and the coefficient C corresponding to the workpiece or the material of the cutting tool in actual cutting are not stored in the tool information storage, the rate of tool life consumption by the actual cutting can be calculated by using the cutting temperature information in the actual cutting, and the remaining life information stored in the remaining life information storage can be updated with the calculated rate of tool life consumption. Note that the temperature information may be temperature data itself or may be information which indirectly indicates a temperature. The temperature data can be obtained by directly measuring a temperature near a cut portion with a thermometer or by measuring a temperature of a cut portion or a temperature of chips with an infrared camera. Further, examples of the information which indirectly indicates a temperature include color data of chips, that is, hue data in an HSV color space and data in other color spaces, and, for example, such data can be obtained by obtaining color image data (RGB data) of chips and converting the color image data into data in an appropriate color space.

(Ninth Mode)

A machining management apparatus according to a ninth mode is such that the machining management apparatus according to the fourth mode further includes an adapted cutting speed calculator receiving, as freely set machining conditions, information on the tool life influencing factors and information on a desired cutting time, recognizing the coefficient n and coefficient C corresponding to the received tool life influencing factors by referring to the tool information storage based on the received information on the tool life influencing factors, recognizing the information on the remaining life information of the cutting tool by referring to the remaining life information storage, and calculating a cutting speed adapted to the desired cutting time according to the tool life equation based on the recognized coefficient n, coefficient C, and information on the remaining life of the cutting tool.

In this machining management apparatus, when information on the tool life influencing factors and information on a desired cutting time, which are freely set machining conditions, are input into the adapted cutting speed calculator, the coefficient n and the coefficient C corresponding to the input tool life influencing factors are recognized and the information on the remaining life of the cutting tool is recognized. Subsequently, a cutting speed adapted to the desired cutting time is calculated based on the recognized coefficient n, coefficient C, and information on the remaining life of the cutting tool.

Thus, with this machining management apparatus, when machining a predetermined workpiece with a predetermined cutting tool, the operator can obtain information on a cutting speed adapted to a desired cutting time by inputting information on the tool life influencing factors that includes information on the workpiece and the material of the cutting tool, and the desired cutting time. Therefore, when desiring to perform a continuous machining while avoiding tool replacement as much as possible, the operator can easily obtain a cutting speed adapted to such a cutting time, in other words, adapted to the remaining tool life time of the cutting tool that is a cutting time from the current point to reaching the end of the tool life of the cutting tool.

(Tenth Mode)

A machining management apparatus according to a tenth mode is such that the machining management apparatus according to the fifth mode further includes an adapted cutting speed calculator receiving, as freely set machining conditions, information on the tool life influencing factors and information on a desired cutting time, recognizing the coefficient n and the coefficient C corresponding to the received tool life influencing factors by referring to the tool information storage based on the received information on the tool life influencing factors, recognizing the information on the remaining life of the cutting tool by referring to the remaining life information storage, and calculating a cutting speed adapted to the desired cutting time according to the tool life equation based on the recognized coefficient n, coefficient C, and information on the remaining life of the cutting tool.

In this machining management apparatus, similarly to the ninth mode, when information on the tool life influencing factors and information on a desired cutting time, which are freely set machining conditions, are input into the adapted cutting speed calculator, the coefficient n and the coefficient C corresponding to the input tool life influencing factors are recognized and the information on the remaining life of the cutting tool is recognized. Subsequently, a cutting speed adapted to the desired cutting time is calculated based on the recognized coefficient n, coefficient C, and information on the remaining life of the cutting tool. Therefore, when machining a predetermined workpiece with a predetermined cutting tool, the operator can obtain information on a cutting speed adapted to a desired cutting time by inputting information on the tool life influencing factors that includes information on the workpiece and the material of the cutting tool, and the desired cutting time. Therefore, when desiring to perform a continuous machining while avoiding tool replacement as much as possible, the operator can easily obtain a cutting speed adapted to such a cutting time, in other words, adapted to the remaining tool life time of the cutting tool.

(Eleventh Mode)

A machining management apparatus according to an eleventh mode is such that the machining management apparatus according to the first mode or the fourth mode further includes a tool information generator configured to receive at least two sets of history information along with information on the tool life influencing factors, the history information being obtained by machining a set workpiece with a set cutting tool and accumulating an information pair containing a cutting speed and a cutting time under the cutting speed until the cutting tool reaches the end of its tool life, calculate the coefficient n and the coefficient C corresponding to the tool life influencing factors according to the tool life equation based on the received two sets of history information, and store the calculated coefficient n and coefficient C along with the information on the tool life influencing factors into the tool information storage.

In this machining management apparatus, first, two sets of history information and information on the tool life influencing factors corresponding to the history information are input into the tool information generator. In the tool information generator, based on the input two sets of history information, the coefficient n and the coefficient C corresponding to the tool life influencing factors are calculated according to the above-described tool life equation, and the calculated coefficient n and coefficient C are stored into the tool life information storage, along with the information on the tool life influencing factors.

Thus, according to this machining management apparatus, in the case where data on the coefficient n and the coefficient C corresponding to predetermined tool life influencing factors are not stored in the tool information storage, actual machining is performed using the workpiece and the cutting tool corresponding to the tool life influencing factors and history information containing pairs of cutting speeds and cutting times under the cutting speeds accumulated until the cutting tool reaches the end of its tool life is obtained, whereby it is made possible to calculate the coefficient n and the coefficient C corresponding to the tool life influencing factors including the workpiece and the material of the cutting tool. By storing the calculated coefficient n and coefficient C into the tool information storage, the information stored in the tool information storage can be enhanced.

(Twelfth Mode)

A machining management apparatus according to a twelfth mode is such that the machining management apparatus according to the second mode or the fifth mode further includes a tool information generator configured to receive at least two sets of history information along with information on the tool life influencing factors, the history information being obtained by machining a set workpiece with a set cutting tool with a condition set with respect to at least any one of the feed amount of the cutting tool, the width of cut, and the depth of cut and accumulating an information pair containing a cutting speed and a cutting time under the cutting speed until the cutting tool reaches the end of its tool life, calculate the coefficient n and the coefficient C corresponding to the tool life influencing factors according to the tool life equation based on the received two sets of history information, and store the calculated coefficient n and coefficient C along with the information on the tool life influencing factors into the tool information storage.

This machining management apparatus is different from the above-described machining management apparatus according to the eleventh mode in that it takes into account any one of the feed amount of the cutting tool, the width of cut, and the depth of cut. Therefore, according to this machining management apparatus, in the case where the state of wear of the cutting tool varies in accordance with any one of the feed amount of the cutting tool, the width of cut, and the depth of cut, more accurate coefficient n and coefficient C taking it into account can be calculated.

(Thirteenth Mode)

A machining management apparatus according to a thirteenth mode is such that, in the machining management apparatus according to the fourth mode or the fifth mode, the tool information storage is configured to further store therein a correction coefficient for tool life set for each of the cutting tools, and the remaining life information update part is configured to, in the initial value setting processing, correct the initial value for the cutting tool in accordance with the correction coefficient for the cutting tool obtained by referring to the correction coefficient for the cutting tool stored in the tool information storage.

In this machining management apparatus, in the remaining life information update part, the initial value of the information on the remaining life of each cutting tool stored in the remaining life information storage is corrected with the correction coefficient therefor stored in the tool information storage. As described above, in judging the tool life of a cutting tool, in the case where machining is performed with a predetermined workpiece and a predetermined cutting tool or with a predetermined workpiece, a predetermined cutting tool, and a predetermined width of cut, the operator may judge that the time until judging that the cutting tool has reached the end of its tool life can be slightly extended or that the time should be slightly shortened, based on his experiential knowledge. Therefore, collecting the initial value of the information on the remaining life of each cutting tool stored in the remaining life information storage with an appropriate correction coefficient enables a flexible response to such operator's experiential judgement.

(Fourteenth Mode)

A machining management apparatus according to a fourteenth mode is such that, in the machining management apparatus according to the fourth mode, the fifth mode, the ninth mode, or the tenth mode, the tool information storage is configured to further store therein a correction coefficient for tool life set for each of the cutting tools, and the remaining life information update part is configured to, in the coefficient recognition processing, recognize a corresponding correction coefficient, and, in the update processing, correct the recognized rate of tool life consumption in accordance with the correction coefficient.

In this machining management apparatus, in the update processing in the remaining life information update part, the tool life consumption rate is corrected in accordance with the correction coefficient. Therefore, setting the correction coefficient as appropriate based on operator's experiential knowledge allows the time when the cutting tool is judged to have reached the end of its tool life to be adjusted, which enables a flexible management based on operator's experiential knowledge.

(Fifteenth Mode)

A machining management apparatus according to a fifteenth mode is such that, in the machining management apparatus according to any one of the fourth to fourteenth modes, the remaining life information update part is configured to make notification to outside when an existence of a cutting tool which has reached the end of its tool life is confirmed.

According to this machining management apparatus, when a existence of a cutting tool which has reached the end of its tool life is confirmed, this is notified to the outside; therefore, the operator can recognize the cutting tool that has reached the end of its tool life quickly as appropriate, without confirming the remaining life information stored in the remaining life information storage.

As described above, with the machining management apparatus according to the first mode of the present disclosure, when machining a predetermined workpiece with a predetermined cutting tool, the operator can obtain information on a cutting speed adapted to a desired cutting time by inputting information on the tool life influencing factors, which includes at least information on the workpiece and the material of the cutting tool, and the desired cutting time. Therefore, when desiring to perform a continuous machining while avoiding tool replacement as much as possible, the operator can easily obtain a cutting speed adapted to such a cutting time.

Further, with the machining management apparatus according to the fourth mode, the operator can recognize the remaining tool life time of each cutting tool by checking the remaining life information stored in the remaining life information storage; therefore, the operator can promptly take an action, such as preparing for tool replacement or the like, in accordance with the state of the remaining tool life time. Further, the operator can quantitatively recognize whether each cutting tool has reached the end of its tool life.

Furthermore, the machining management apparatuses according to the second and third modes and the machining management apparatuses according to the fifth to fifteenth modes also respectively achieve the above-described effects.

BRIEF DESCRIPTION OF THE DRAWINGS

FIG. 2 is a data table showing data stored in a tool information storage according to the embodiment;

DETAILED DESCRIPTION

Figure 1:
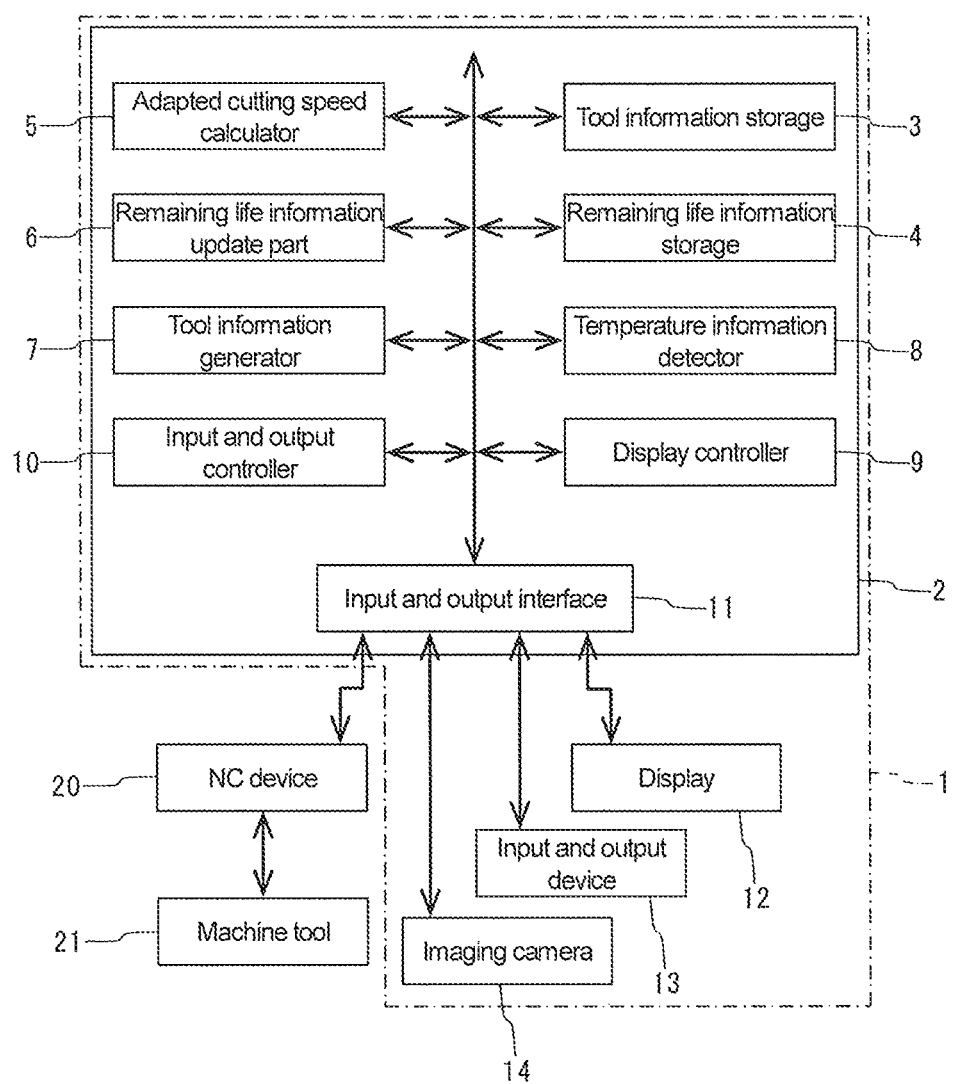
FIG. 1 is a block diagram showing a machining management apparatus according to an embodiment of the present disclosure, along with other elements.

Hereinafter, a specific embodiment of the present disclosure will be described with reference to the drawings. FIG. 1 is a block diagram showing a machining management apparatus according to this embodiment, along with other elements.

As shown in FIG. 1, the machining management apparatus 1 according to this embodiment is composed of a computing device 2, a display 12, an input and output device 13, and an imaging camera 14. The computing device 2 includes a tool information storage 3, a remaining life information storage 4, an adapted cutting speed calculator 5, a remaining life information update part 6, a tool information generator 7, a temperature information detector 8, a display controller 9, an input and output controller 10, and an input and output interface 11. The display 12, the input and output device 13, and the imaging camera 14 are each connected to the input and output interface 11. Further, an NC device 20 for controlling a machine tool 21 is connected to the input and output interface 11 of the computing device 2. Each of these components is described in detail below.

Note that the computing device 2 is composed of a so-called computer including a CPU, an ROM, and an RAM. Further, the tool information storage 3 and the remaining life information storage 4 are each composed of a readable and writable storage medium such as an RAM, and the adapted cutting speed calculator 5, the remaining life information update part 6, the tool information generator 7, the temperature information detector 8, the display controller 9, and the input and output controller 10 are each composed of software capable of executing their respective functions.

1. Display and Input and Output Device

The display 12 displays character information and images thereon and is composed of a typical liquid crystal display, a touch panel, or the like. Further, the input and output device 13 is composed of, for example, an input device such as a keyboard, a data output device for outputting data to an appropriate storage medium, an audio output device for outputting sounds, and other components. In the case where the display 12 is composed of a touch panel and the touch panel is sufficient as a device for input and output, the input and output device 13 does not particularly need to be provided. In such a case, the functions executed by the input and output device 13 in the following description are executed by the touch panel instead.

2. Imaging Camera

The imaging camera 14 is a device for capturing a color image and is composed of, for example, an area sensor camera. The imaging camera 14 is disposed such that an imaging area thereof is set within a machining area of the machine tool 21. The imaging camera 14 captures a color image of chips, which are produced when a workpiece is machined with a cutting tool, at predetermined time intervals, and inputs obtained color image data into the computing device 2 through the input and output interface 11.

3. Display Controller and Input and Output Controller

The display controller 9 is a functional unit that controls display on the display 12, and the input and output controller 10 is a functional unit that controls input of data into the computing device 2 through the input and output device 13 and output of data from the computing device 2 to the input and output device 13. Note that, in the case where the display 12 is composed of a touch panel, the display controller 9 and the input and output controller 10 are configured to control display on the touch panel and input through the touch panel, respectively.

4. Tool Information Storage

The tool information storage 3 is a functional unit that stores therein information relating to each of cutting tools used in the machine tool 21. Specifically, the tool information storage 3 stores therein, in the form of a data table as shown in FIG. 2, data on a tool type, a tool material, a workpiece material, a width of cut, a standard cutting speed, a standard tool life time, a hue of chips, a correction coefficient, a coefficient n, and a coefficient C. Note that these data are stored into the tool information storage 3 by being input through the input and output device 13.

The coefficient n and the coefficient C are respectively a coefficient n and a coefficient C in the following equation, which is the Taylor's tool life equation:

$$V \cdot T^n = C.$$

The coefficient n and the coefficient C are obtained in an empirical manner, such as by performing trial machining with appropriately set workpiece, cutting tool material, and width of cut (hereinafter, referred to as "tool life influencing factors"). The coefficient n and the coefficient C are previously obtained and stored into the tool information storage 3 for each workpiece having a possibility of being machined by the machine tool, each tool (tool material) used in the machine tool, and each width of cut.

Note that the reason why the width of cut is taken into account is that the temperature of a cutting edge of a cutting tool in cutting varies in accordance with the width of cut, for example because, in the case where the cutting tool is an end mill, there is a racing time; as a result thereof, the state of wear of the cutting tool and the tool life time of the cutting tool vary and, in response thereto, the values of the coefficient n and coefficient C vary.

The standard cutting speed and the standard tool life time are, for example, provided by the manufacturer of the cutting tool. The standard cutting speed is a cutting speed recommended with respect to the corresponding workpiece and cutting tool, and the standard tool life time is a tool life time of the cutting tool for the case where machining is performed at the standard cutting speed. Further, the hue of chips is a hue of chips obtained when machining is performed at the standard cutting speed, which is provided by the manufacturer of the cutting tool or empirically obtained by obtaining a hue of chips when machining is performed with the corresponding workpiece, cutting tool, width of cut, and standard cutting speed.

A color other than metallic colors appears on chips, and this color is caused by an interfered light that is produced corresponding to the thickness of an oxide film formed on the chips due to cutting heat. Such a color is called "temper color" and changes in the order of pale yellow, orange, red, purple, and blue as the film thickness is increased by increase of the temperature. Therefore, by seeing the hue of chips, the cutting heat under the particular conditions can be recognized.

The hue of chips can be obtained by converting RGB color space data (RGB data) of chips obtained immediately after cutting, which is color image data of chips obtained immediately after cutting, into HSV color space data (HSV data). Note that the HSV data consists of "hue", "saturation", and "value". The hue changes between 0.0 and 360.0 and is represented by an angle on a color circle showing the hue. The above-described imaging camera 14 can be used for capturing the color image. Further, it is preferred that a illuminator used when capturing an image of chips (for example, an illuminator in the machine tool) is a white light source (for example, a halogen lamp or the like); RGB-type fluorescent lamp and LED illuminator, which emit lights of the three primary colors, are not suitable when capturing an image of chips.

The correction coefficient is for correcting the tool life time of the cutting tool in judging the tool life of the cutting tool; the correction coefficient is freely set by the operator as necessary. When performing machining with predetermined machining conditions set with respect to the tool life influencing factors (workpiece, cutting tool, and width of cut), the operator may judge that the time until judging that the cutting tool has reached the end of its tool life can be slightly extended or that the time should be slightly shortened, based on his experiential knowledge. The correction coefficient is used for such adjustment.

The data stored in the tool information storage 3 can be displayed on the display 12 under control by the display controller 9, and can be output to the input and output device 13 under control by the input and output controller 10.

5. Remaining Life Information Storage

The remaining life information storage 4 is a functional unit that stores therein information on the remaining life of each of the cutting tools used in the machine tool 21; in this embodiment, the remaining life information storage 4 stores therein a remaining life rate of each of the cutting tools. The remaining life rate is conceptually defined as what is obtained by dividing the remaining tool life time by the tool life time. The remaining life rate of each cutting tool is numerically expressed such that the remaining life rate is "1.0" when the cutting tool is new, tool life consumptions by actual cutting are sequentially subtracted therefrom, and the remaining life rate becomes "0" when the cutting tool reaches the end of its tool life.

For example, if a cutting tool reaches the end of its tool life after machining at a cutting speed $V_1$ for a period of time $t_1$, machining at a cutting speed $V_2$ for a period of time $t_2$, and then machining at a cutting speed $V_3$ for a period of time $t_3$ are performed, a remaining life rate $B_1$ after the machining at the cutting speed $V_1$ for the period of time $t_1$ is represented by the following equation:

$$B_1 = (T_1 - t_1)/T_1 = 1 - (t_1/T_1),$$

where $T_1$ is a tool life time for the case where a continuous machining is performed at the cutting speed $V_1$, and $t_1/T_1$ is understood as a tool life consumption rate.

In the same manner, a tool life consumption rate of the machining at the cutting speed $V_2$ for the period of time $t_2$ can be represented by $t_2/T_2$, where $T_2$ is a tool life time for the case where a continuous machining is performed at the cutting speed $V_2$. Therefore, a remaining life rate $B_2$ after the machining at the cutting speed $V_2$ for the period of time $t_2$ is represented by the following equation:

$$B_2 = B - (t_2/T_2) = 1 - (t_1/T_1) - (t_2/T_2).$$

Further, a tool life consumption rate of the machining at the cutting speed $V_3$ for the period of time $t_3$ can be represented by $t_3/T_3$, where $T_3$ is a tool life time for the case where a continuous machining is performed at the cutting speed $V_3$. Therefore, a remaining life rate $B_3$ after the machining at the cutting speed $V_3$ for the period of time $t_3$ is represented by the following equation:

$$B_3 = B_2 - (t_3/T_3) = 1 - (t_1/T_1) - (t_2/T_2) - (t_3/T_3) = 0.$$

Thus, the remaining life information storage 4 stores therein such a remaining life rate for each cutting tool.

The data stored in the remaining life information storage 4 also can be displayed on the display 12 under control by the display controller 9, and can be output to the input and output device 13 under control by the input and output controller 10.

6. Temperature Information Detector

Figures 3, 4:
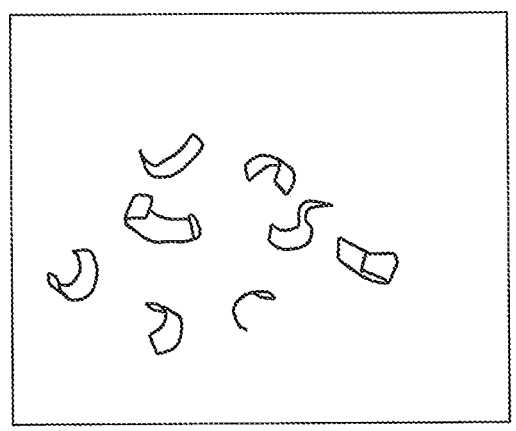
FIG. 3 is a data table showing data stored in a remaining life information storage according to the embodiment.
FIG. 4 is an illustration for explaining a processing in a temperature information detector according to the embodiment.
Figure 5:
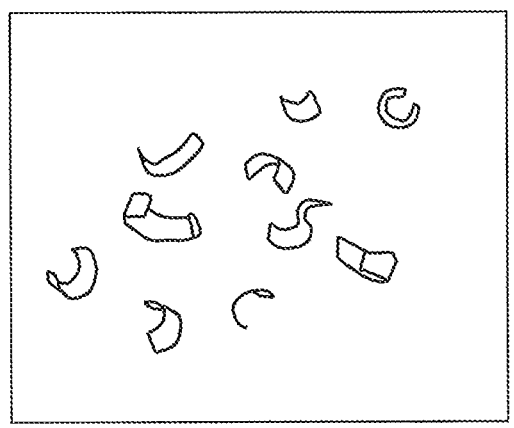
FIG. 5 is an illustration for explaining the processing in the temperature information detector according to the embodiment.
Figure 6:
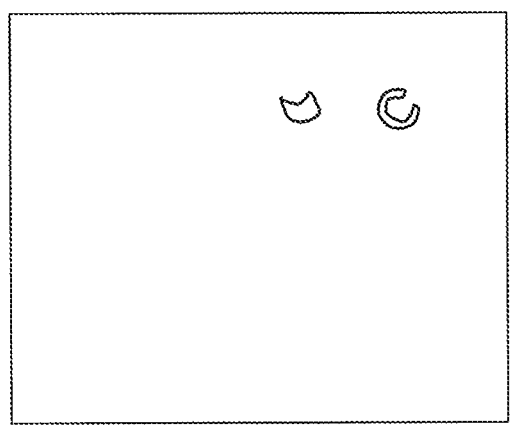
FIG. 6 is an illustration for explaining the processing in the temperature information detector according to the embodiment.

The temperature information detector 8 successively processes chips images that are captured by the imagining camera 14 and input from the imaging camera 14, extracts an image containing only the newest chips, converts obtained image data into HSV data, calculates the hue of the chips, and holds calculated hue data while successively updating it. For example, if the images shown in FIGS. 4 and 5 are successively input from the imaging camera 14, the temperature information detector 8 temporarily holds image data of these images, extracts an image containing only the new chips as shown in FIG. 6 by performing a processing of taking a difference between the two image data, converts obtained image data into HSV data, and calculates the hue of the chips. Thus, the temperature information detector 8 successively extracts images containing only the newest chips by performing the processing of taking a difference between image data of adjacent two images that are successively input from the imaging camera 14, calculates the hue data of the chips, and holds the calculated hue data while successively updating it.

7. Remaining Life Information Update Part

The remaining life information update part 6 is a functional unit that executes an initial value setting processing, a coefficient recognition processing, an update processing, and a notification processing, which are describe 1) Initial Value Setting Processing The initial value setting processing is such that, when a cutting tool is replaced with a new one, the operator inputs, through the input and output device 13, information indicating that the cutting tool is new, and the remaining life information update part 6 receives the input information and sets the remaining life rate of the corresponding cutting tool stored in the remaining life information storage 4 to the initial value "1.0". In this process, the remaining life information update part 6 refers to the tool information storage 3, and, in the case where the correction coefficient is set for the corresponding cutting tool, corrects the initial value in accordance with the correction coefficient. Note that the initial value "1.0" is a standard remaining life rate.

For example, in the case where a cutting tool corresponding to "Tool No. 1" shown in FIG. 3 is replaced with a new one, the remaining life information update part 6 first receives input of information about the replacement, and recognizes that the tool type of the "Tool No. 1" is "K1", by referring to the data table shown in FIG. 3 that is stored in the remaining life information storage 4. Subsequently, the remaining life information update part 6 recognizes the correction coefficient "0.9" for the tool type "K1" by referring to the data table shown in FIG. 2 that is stored in the tool information storage 3, and divides "1.0", which is the standard initial value of the remaining life rate, by the correction coefficient "0.9", thereby obtaining "1.1" as a corrected initial value of the remaining life rate, the obtained remaining life rate being stored into the remaining life information storage 4. Note that the correction coefficient in this embodiment is defined as a divisor; however, a correction coefficient which is defined as a multiplier may be used.

2) Coefficient Recognition Processing

The remaining life information update part 6 recognizes information on the tool life influencing factors in actual cutting performed in the machine tool 21 as well as an actual cutting speed and an actual cutting time under the actual cutting speed in the actual cutting, and recognizes the coefficient n and the coefficient C corresponding to the recognized information on the tool life influencing factors (the workpiece to be cut, each cutting tool, and the width of cut for each cutting tool) by referring to the tool information storage 3 based on the recognized information on the tool life influencing factors (coefficient recognition processing).

As for the recognition of the information on the tool life influencing factors in actual cutting, for example, the operator can input the information on the tool life influencing factors through the input and output device 13 before the cutting is performed in the machine tool 21, thereby causing the remaining life information update part 6 to recognize the information. Alternatively, the remaining life information update part 6 can recognize the information on the tool life influencing factors by receiving, from the NC device 20, information on the tool life influencing factors which is interpreted from codes contained in an NC program for the cutting that is executed by the NC device 20. As for the recognition of the actual cutting speed and the actual cutting time under the actual cutting speed, the remaining life information update part 6 can similarly recognize them by receiving, from the NC device 20, an actual cutting speed and an actual cutting time under the actual cutting speed which are interpreted from codes contained in the NC program.

By referring to the tool information storage 3 based on the thus-recognized information on the tool life influencing factors, the remaining life information update part 6 recognizes the coefficient n and the coefficient C corresponding to the information on the tool influencing factors (the workpiece to be cut, each cutting tool, and the width of cut for each cutting tool).

Note that, in the case where the coefficient C corresponding to the recognized information on the tool life influencing factors is not stored in the tool information storage 3 but the standard cutting speed, the standard tool life time, and the coefficient n corresponding to the recognized information on the tool life influencing factors are stored, the remaining life information update part 6 recognizes the standard cutting speed, the standard tool life time, and the coefficient n.

On the other hand, in the case where the coefficient n and the coefficient C corresponding to the recognized information on the tool life influencing factors are not stored in the tool information storage 3 but the hue corresponding to the recognized information on the tool life influencing factors is stored, the remaining life information update part 6 obtains hue data in the actual cutting detected by the temperature information detector 8 from the temperature information detector 8 and refers to the tool information storage 3 based on the obtained hue data, thereby recognizing the coefficient n and the coefficient C corresponding to the same hue as that in the actual cutting or the coefficient n and the coefficient C corresponding to a hue approximating to that in the actual cutting as the coefficient n and the coefficient C corresponding to the recognized information on the tool life influencing factors (the workpiece to be cut, each cutting tool, and the width of cut for each cutting tool).

3) Update Processing

The remaining life information update part 6 calculates a rate of tool life consumption by the actual cutting (tool life consumption rate of the actual cutting) for each of the corresponding cutting tools based on the actual cutting speed, actual cutting time, coefficient n, and coefficient C for the cutting tool obtained by the above-described coefficient recognition processing, and subtracts the recognized tool life consumption rate from the remaining life rate of the cutting tool stored in the remaining life information storage 4, thereby updating the remaining life rate of each of the corresponding cutting tools (update processing).

The method for calculating the tool life consumption rate and the method for calculating the remaining life rate have been explained above; however, these calculation methods are now simply explained again just to be sure. For example, if a cutting tool reaches the end of its tool life after machining at a cutting speed $V_1$ for a period of time $t_1$, machining at a cutting speed $V_2$ for a period of time $t_2$, and then machining at a cutting speed $V_3$ for a period of time $t_3$ are performed, a remaining life rate $B_1$ after the machining at the cutting speed $V_1$ for the period of time $t_1$, a remaining life rate $B_2$ after the machining at the cutting speed $V_2$ for the period of time $t_2$, and a remaining life rate $B_3$ after the machining at the cutting speed $V_3$ for the period of time $t_3$ are respectively represented by the following equations. Note that the initial value of the remaining life rate B in this case is 1/k, where k is the correction coefficient.

$$B_1 = 1/k - (t_1/T_1);$$

$$B_2 = B_1 - (t_2/T_2) = 1/k - (t_1/T_1) - (t_2/T_2); \text{ and}$$

$$B_3 = B_2 - (t_3/T_3) = 1/k - (t_1/T_1) - (t_2/T_2) - (t_3/T_3) = 0,$$

wherein $T_1$ is a tool life time for the case where a continuous machining is performed at the cutting speed $V_1$, $T_2$ is a tool life time for the case where a continuous machining is performed at the cutting speed $V_2$, and $T_3$ is a tool life time for the case where a continuous machining is performed at the cutting speed $V_3$. These tool life times are respectively calculated by the following equations using the coefficient n and the coefficient C:

$$T_1 = (C/V_1)^{1/n};$$

$$T_2 = (C/V_2)^{1/n}; \text{ and}$$

$$T_3 = (C/V_3)^{1/n}.$$

Further, $t_1/T_1$, $t_2/T_2$, and $t_3/T_3$ are each a tool life consumption rate.

Note that, in the case where the coefficient C corresponding to the information on the tool life influencing factors in the actual cutting is not stored in the tool information storage 3 but the standard cutting speed, the standard tool life time, and the coefficient n corresponding to the information are stored, the remaining life information update part 6, as described above, recognizes the standard cutting speed, the standard tool life time, and the coefficient n in the coefficient recognition processing. In this update processing, the remaining life information update part 6 calculates the rate of tool life consumption by the actual cutting using the recognized standard cutting speed, standard tool life time, and coefficient n, thereby updating the remaining life rate stored in the remaining life information storage 4.

Based on the Taylor's tool life equation, the following equation holds, where $V_s$ is the standard cutting speed, $T_s$ is the standard tool life time for the case where machining is performed at the standard cutting speed $V_s$, and $T_1$ is a tool life time for the case where machining is performed at a certain cutting speed $V_1$:

$$V_1 \cdot T_1{}^n = V_s \cdot T_s{}^n = C.$$

By transforming this equation, the tool life time $T_1$ for the case where machining is performed at the cutting speed $V_1$ can be represented by the following equation:

$$T_1 = T_s \cdot (V_s/V_1)^{1/n}.$$

Accordingly, a tool life consumption rate $t_1/T_1$ after machining at the cutting speed $V_1$ for a period of time $t_1$ is calculated by the following equation:

$$t_1/T_1 = t_1/(T_s \cdot (V_s/V_1)^{1/n}).$$

Further, in the case where neither the coefficient C corresponding to the information on the tool life influencing factors in the actual cutting nor the standard cutting speed, the standard tool life time, the coefficient n corresponding to the information are stored in the tool information storage 3 but the hue corresponding to the information is stored, the remaining life information update part 6, as described above, in the coefficient recognition processing, obtains hue data in the actual cutting detected by the temperature information detector 8 from the temperature information detector 8 and refers to the tool information storage 3 based on the obtained hue data, thereby recognizing the coefficient n and the coefficient C corresponding to the same hue as that in the actual cutting or the coefficient n and the coefficient C corresponding to a hue approximating to that in the actual cutting as the coefficient n and the coefficient C corresponding to the information on the tool life influencing factors. In this case, the remaining life information update part 6 calculates the rate of tool life consumption by the actual cutting using the thus-recognized coefficient n and coefficient C and updates the remaining life rate stored in the remaining life information storage 4 with the calculated tool life consumption rate.

4) Notification Processing

When an existence of a cutting tool whose remaining life rate stored in the remaining life information storage 4 becomes "0" after being updated is confirmed, the remaining life information update part 6 recognizes that the cutting tool has reached the end of its tool life, and make notification to the outside that the cutting tool has reached the end of its tool life (notification processing). Examples of the manner of the notification include displaying an alarm on the display 12 via the display controller 9.

8. Adapted Cutting Speed Calculator

The adapted cutting speed calculator 5 is a functional unit that calculates a cutting speed adapted to a desired machining; when the operator desires to perform machining for a predetermined period of time with predetermined machining conditions set with respect to the tool life influencing factors, the adapted cutting speed calculator 5 calculates a cutting speed adapted to the operator's desired machining.

Specifically, the adapted cutting speed calculator 5 first receives, as machining conditions, information on the tool life influencing factors (a workpiece to be cut, a cutting tool, and a width of cut) and information on a desired cutting time, which are input by the operator through the input and output device 13. Based on the received information on the tool life influencing factors, the adapted cutting speed calculator 5 recognizes the coefficient n and the coefficient C corresponding to the information on the tool life influencing factors by referring to the tool information storage 3, and recognizes the remaining life rate of the cutting tool by referring to the remaining life information storage 4.

Subsequently, based on the recognized coefficient n, coefficient C, and remaining life rate Ba, the adapted cutting speed calculator 5 calculates a cutting speed adapted to the desired cutting time according to the tool life equation, that is, by the following equation, and displays information on the calculated cutting speed on the display 12 via the display controller 9:

$$V_a = C(B_a/T_a)^n,$$

where $T_a$ is the desired cutting time and $V_a$ is the cutting speed adapted to the desired cutting time.

9. Tool Information Generator

The tool information generator 7 is a functional unit that calculates the coefficient n and the coefficient C corresponding to information on the tool life influencing factors based on machining history information input through the input and output device 13 and stores the calculated coefficient n and coefficient C into the tool information storage 3.

Figures 7, 8:
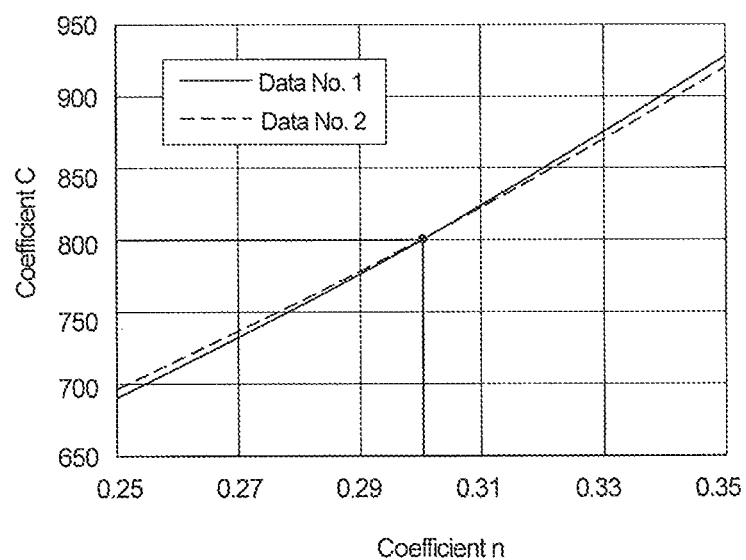
FIG. 7 is an illustration showing examples of machining history data.
FIG. 8 is a graph showing a relationship between a coefficient n and a coefficient C obtained from the machining history data.

Specifically, the tool information generator 7 first receives at least two sets of machining history information input through the input and output device 13. The machining history information is history information obtained by machining a predetermined workpiece with a predetermined cutting tool and a predetermined width of cut (with predetermined conditions set with respect to the tool life influencing factors) and accumulating an information pair containing a cutting speed and a cutting time under the cutting speed until the cutting tool reaches the end of its tool life. The machining history information is input along with corresponding information on the tool life influencing factors through the input and output device 13. Examples of the thus-input machining history information are shown in FIG. 7.

Subsequently, based on the received two sets of machining history information, the tool information generator 7 calculates the coefficient n and the coefficient C corresponding to the information on the tool life influencing factors according to the tool life equation.

As described above, if a cutting tool reaches the end of its tool life after machining at a cutting speed $V_1$ for a period of time $t_1$, machining at a cutting speed $V_2$ for a period of time $t_2$, and then machining at a cutting speed $V_3$ for a period of time $t_3$ are performed, tool life consumption rates of these machinings can be respectively represented by $t_1/T_1$, $t_2/T_2$, and $t_3/T_3$, where $T_1$ is a tool life time for the case where a continuous machining is performed at the cutting speed $V_1$, $T_2$ is a tool life time for the case where a continuous machining is performed at the cutting speed $V_2$, and $T_3$ is a tool life time for the case where a continuous machining is performed at the cutting speed $V_3$. Therefore, if the remaining life rate is "1", the following equation holds:

$$1 = t_1/T_1 + t_2/T_2 + t_3/T_3.$$

Note that, because the following equations hold:

$$T_1 = (C/V_1)^{1/n};$$

$$T_2 = (C/V_2)^{1/n}; \text{ and}$$

$$T_3 = (C/V_3)^{1/n},$$

the following equation holds:

$$1 = t_1 \cdot (V_1/C)^{1/n} + t_2 \cdot (V_2/C)^{1/n} + t_3 \cdot (V_3/C)^{1/n}.$$

By generalizing this equation, the following equation is obtained:

$$1 = t_1 \cdot (V_1/C)^{1/n} + \ldots + t_i \cdot (V_i/C)^{1/n}.$$

There are two unknowns: the coefficient n and the coefficient C; therefore, theoretically, two sets of machining history data are enough for deriving the coefficient n and the coefficient C. For example, the coefficient n and the coefficient C can be obtained as follows: preparing two equations obtained by substituting each of two sets of machining history data for the above generalized equation; for each of the prepared equations, calculating the value of the coefficient C while changing the value of the coefficient n; and deriving the coefficient n and the coefficient C as the solution of the two equations from the intersection of two lines obtained by plotting data obtained by the calculation on a graph (see FIG. 8).

Through the above-described process, the tool information generator 7 calculates the coefficient n and the coefficient C corresponding to information on the tool life influencing factors based on machining history information, and stores information on the calculated coefficient n and coefficient C into the tool information storage 3.

With the machining management apparatus 1 according to this embodiment having the above-described configuration, when machining a predetermined workpiece with a predetermined cutting tool, the operator inputs information on the workpiece, the material of the cutting tool, and the width of cut therefor (tool life influencing factors) and information on a desired cutting time through the input and output device 13, whereby a cutting speed which conforms to the remaining life rate of the cutting tool and is adapted to the desired cutting time is calculated in the adapted cutting speed calculator 5 and information on the calculated cutting speed is displayed on the display 12. Accordingly, when desiring to perform a continuous machining while avoiding tool replacement as much as possible, for example, in order to minimize costs for tools or prevent the machining time from being lengthened by tool replacement, the operator can easily obtain a cutting speed adapted to such a cutting time.

Further, in the machining management apparatus 1 according to this embodiment, the remaining life rate of each of the cutting tools used in the machine tool 21 is stored in the remaining life information storage 4, and when machining is performed in the machine tool 21, for each of the cutting tools used in the machining, the remaining life information update part 6 calculates a rate of tool life consumption by the machining (tool life consumption rate of the machining) and subtracts the calculated tool life consumption rate from the exiting remaining life rate stored in the remaining life information storage 4, thereby updating the remaining life rate stored in the remaining life information storage 4. When an existence of a cutting tool whose remaining life rate becomes "0" is confirmed, it is notified to the outside that the cutting tool has reached the end of its tool life.

Therefore, the operator can accurately recognize that each cutting tool has reached the end of its tool life, and therefore the operator can suitably take an action, such as replacing the cutting tool, as appropriate. Further, the operator can quantitatively recognize the degree of wear of each cutting tool by checking the remaining life rate thereof stored in the remaining life information storage 4, and therefore the operator can previously take a preliminary action, such as preparing for tool replacement.

Further, in this machining management apparatus 1, when an initial value is set for the remaining life rate of each cutting tool stored in the remaining life information storage 4 in the remaining life information update part 6, the initial value is corrected with the correction coefficient stored in the tool information storage 3. Therefore, for a cutting tool for which, based on the operator's experiential knowledge, it is judged that the time until judging that the cutting tool has reached the end of its tool life can be slightly extended or that the time should be slightly shortened, setting the correction coefficient for the cutting tool in accordance with such judgement allows the tool life time of the cutting tool to be adjusted so that the operator's knowledge is reflected therein.

Further, when the tool life consumption rate is calculated in the remaining life information update part 6, in the case where the coefficient C corresponding to the associated workpiece, cutting tool material, and width of cut (tool life influencing factors) is not stored in the tool information storage 3 but the standard cutting speed $V_s$, the standard tool life time $T_s$, and the coefficient n corresponding to the associated tool life influencing factors are stored, the tool life consumption rate is calculated using them; therefore, tool life management can be flexibly performed.

Further, when the tool life consumption rate is calculated in the remaining life information update part 6, in the case where the coefficient n and the coefficient C corresponding to the associated workpiece, cutting tool material, and width of cut (tool life influencing factors) are not stored in the tool information storage 3 but information on the hue of chips is stored in association with the coefficient n and the coefficient C in the tool information storage 3, the remaining life information update part 6 refers to the data stored in the tool information storage 3 based on hue data detected by the temperature information detector 8 in the actual cutting and estimates the coefficient n and the coefficient C corresponding to the actual cutting, thereby calculating the tool life consumption rate. Therefore, also in this respect, tool life management can be flexibly performed.

Further, in this machining management apparatus 1, in the case where there have been obtained at least two sets of machining history information that is obtained by machining a predetermined workpiece with predetermined cutting tool and width of cut (performing machining with predetermined conditions set with respect to the tool life influencing factors) and accumulating an information pair containing a cutting speed and a cutting time under the cutting speed until the cutting tool reaches the end of its tool life, inputting the two sets of machining history information along with information on the tool life influencing factors causes the tool information generator 7 to calculate the coefficient n and the coefficient C corresponding to the information on the tool life influencing factors and store information on the calculated coefficient n and coefficient C into the tool information storage 3. Thus, the information stored in the tool information storage 3 can be enhanced.

Hereinbefore, a specific embodiment of the present disclosure has been described. However, the present disclosure is not limited thereto and can be implemented in other modes.

For example, in the above-described embodiment, factors influencing a tool life (tool life influencing factors) are considered to be the workpiece to be cut, the cutting tool material, and the width of cut; however, depending on the mode of machining, the width of cut does not necessarily have to be taken into account. In such a case, in the above embodiment, the tool life influencing factors may include only the workpiece to be cut and the cutting tool material.

On the other hand, depending on the mode of machining, it is possible that a tool life is influenced to no small extent by a cutting tool feed amount or a depth of cut. In the case where the cutting tool feed amount or the depth of cut is taken into account, the tool life influencing factors in the above embodiment may include, in addition to the above-mentioned workpiece to be cut and cutting tool material, at least any one of the cutting tool feed amount, the width of cut, and the depth of cut. Furthermore, the tool life influencing factors may include factors other than the above-mentioned workpiece to be cut, cutting tool material, feed amount, width of cut, and depth of cut.

Further, in the above embodiment, the correction coefficient is applied to the initial value of the remaining life rate; however, the mode of application of the correction coefficient is not limited thereto. For example, the correction coefficient may be applied to the remaining life consumption rate with the initial value of the remaining life rate set to "1". For example, in the case where machining is performed at a cutting speed V1 for a period of time t1 starting from the state where the remaining life rate of the cutting tool is at the initial value "1", a tool life consumption rate of the machining is:

$$t_1/(k \cdot T_1),$$

where $T_1$ is a tool life time for the case where a continuous machining is performed at the cutting speed $V_1$ and k is the correction coefficient. Further, a remaining life rate $B_1$ after the machining is:

$$B_1 = 1 - t_1/(k \cdot T_1).$$

Applying the correction coefficient in this manner also allows the tool life time to be adjusted so that the operator's knowledge is reflected therein.

Further, in this case, the adapted cutting speed calculator 5 is configured to calculate cutting conditions adapted to a desired cutting time based on the remaining life rate calculated by applying the correction coefficient in the above-described manner.

Further, in the above embodiment, the correction coefficient is reflected; however, the present disclosure is not limited thereto. The above-described correction coefficient may not be reflected in the processings in the remaining life information update part 6 and the adapted cutting speed calculator 5. In this case, the correction efficient does not have to be stored in the tool information storage 3.

Further, in the above embodiment, hue data is used as the temperature information; however, the present disclosure is not limited thereto and another type of color space data may be used. Alternatively, temperature data per se may be used as the temperature information. In this case, the temperature data can be obtained by, in actual cutting, directly measuring a temperature near a cut portion with a thermometer or measuring a temperature of a cut portion or a temperature of chips with an infrared camera.

What is claimed is:

1. A machining management apparatus comprising:
a tool information storage storing therein information relating to each of cutting tools used in a machine tool, the tool information storage storing therein a coefficient n and a coefficient C in a tool life equation below corresponding to tool life influencing factors including at least a workpiece to be cut and a material of the cutting tool;
a remaining life information storage storing therein information on a remaining life of each of the cutting tools; and
a remaining life information update part executing an initial value setting processing of receiving information indicating that each cutting tool is new, and setting the information on the remaining life of the cutting tool stored in the remaining life information storage to an initial value, and executing a coefficient recognition processing of recognizing information on the tool life influencing factors in actual cutting performed in the machine tool and recognizing information on an actual cutting speed and an actual cutting time under the actual cutting speed in the actual cutting, and recognizing the coefficient n and the coefficient C corresponding to the recognized tool life influencing factors by referring to the tool information storage based on the recognized information on the tool life influencing factors, and an update processing of recognizing a rate of tool life consumption by the actual cutting for each of corresponding cutting tools based on the recognized actual cutting speed, actual cutting time, coefficient n, and coefficient C for the cutting tool, and updating the information on the remaining life of each of the corresponding cutting tools stored in the remaining life information storage based on the recognized rate of tool life consumption of the cutting tool:

$$V \cdot T^n = C,$$

where V is a cutting speed, T is a tool life time, and n and C are coefficients.

2. The machining management apparatus according to claim 1, wherein:

the tool information storage is configured to store therein the coefficient n and the coefficient C corresponding to tool life influencing factors including the workpiece to be cut, the material of the cutting tool, and at least any one of a feed amount of the cutting tool, a width of cut, and a depth of cut; and
the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the coefficient n and the coefficient C corresponding to the recognized tool life influencing factors by referring to the tool information storage based on the recognized information on the tool life influencing factors.

3. The machining management apparatus according to claim 2, wherein:

the tool information storage is configured to store therein at least a standard cutting speed, a standard tool life time, the coefficient n, and the coefficient C corresponding to the tool life influencing factors; and
the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the standard cutting speed, the standard tool life time, and the coefficient n corresponding to the recognized tool life influencing factors by referring to the tool information storage based on the recognized information on the tool life influencing factors, and, in the update processing, recognize a rate of tool life consumption by the actual cutting for each of corresponding cutting tools based on the recognized actual cutting speed, actual cutting time, standard cutting speed, standard tool life time, and coefficient n for the cutting tool, and update the information on the remaining life of each of the corresponding cutting tools stored in the remaining life information storage based on the recognized rate of tool life consumption of the cutting tool.

4. The machining management apparatus according to claim 2, further comprising an adapted cutting speed calculator receiving, as freely set machining conditions, information on the tool life influencing factors and information on a desired cutting time, recognizing the coefficient n and the coefficient C corresponding to the received tool life influencing factors by referring to the tool information storage based on the received information on the tool life influencing factors, recognizing the information on the remaining life of the cutting tool by referring to the remaining life information storage, and calculating a cutting speed adapted to the desired cutting time according to the tool life equation based on the recognized coefficient n, coefficient C, and information on the remaining life of the cutting tool.

5. The machining management apparatus according to claim 2, further comprising a tool information generator receiving at least two sets of history information along with information on the tool life influencing factors, the history information being obtained by machining a set workpiece with a set cutting tool with a condition set with respect to at least any one of the feed amount of the cutting tool, the width of cut, and the depth of cut, and accumulating an information pair containing a cutting speed and a cutting time under the cutting speed until the cutting tool reaches an end of its tool life, calculating the coefficient n and the coefficient C corresponding to the tool life influencing factors according to the tool life equation based on the received two sets of history information, and storing the calculated coefficient n and coefficient C along with the information on the tool life influencing factors into the tool information storage.

6. The machining management apparatus according to claim 1, wherein:
the tool information storage is configured to store therein at least a standard cutting speed, a standard tool life time, the coefficient n, and the coefficient C corresponding to the tool life influencing factors; and
the remaining life information update part is configured to, in the coefficient recognition processing, recognize information on the tool life influencing factors in actual cutting performed in the machine tool and recognize information on an actual cutting speed and an actual cutting time under the actual cutting speed in the actual cutting, and recognize the standard cutting speed, the standard tool life time, and the coefficient n corresponding to the recognized tool life influencing factors by referring to the tool information storage based on the recognized information on the tool life influencing factors, and, in the update processing, recognize a rate of tool life consumption by the actual cutting for each of corresponding cutting tools based on the recognized actual cutting speed, actual cutting time, standard cutting speed, standard tool life time, and coefficient n for the cutting tool, and update the information on the remaining life of each of the corresponding cutting tools stored in the remaining life information storage based on the recognized rate of tool life consumption of the cutting tool.

7. The machining management apparatus according to claim 1, wherein:
the machining management apparatus further comprises a temperature information detector for obtaining information on a cutting temperature in cutting a workpiece with each of the cutting tools;
the tool information storage is configured to further store therein the information on the cutting temperature corresponding to the coefficient n and the coefficient C; and
the remaining life information update part is configured to, in the coefficient recognition processing, in a case where the coefficient n and the coefficient C corresponding to the actual cutting are not stored in the tool information storage, estimate the coefficient n and the coefficient C corresponding to the actual cutting by referring to the tool information storage based on the information on the cutting temperature obtained by the temperature information detector, and execute the update processing using the estimated coefficient n and coefficient C.

8. The machining management apparatus according to claim 1, further comprising an adapted cutting speed calculator receiving, as freely set machining conditions, information on the tool life influencing factors and information on a desired cutting time, recognizing the coefficient n and the coefficient C corresponding to the received tool life influencing factors by referring to the tool information storage based on the received information on the tool life influencing factors, recognizing the information on the remaining life of the cutting tool by referring to the remaining life information storage, and calculating a cutting speed adapted to the desired cutting time according to the tool life equation based on the recognized coefficient n, coefficient C, and information on the remaining life of the cutting tool.

9. The machining management apparatus according to claim 1, further comprising a tool information generator receiving at least two sets of history information along with information on the tool life influencing factors, the history information being obtained by machining a set workpiece with a set cutting tool and accumulating an information pair containing a cutting speed and a cutting time under the cutting speed until the cutting tool reaches an end of its tool life, calculating the coefficient n and the coefficient C corresponding to the tool life influencing factors according to the tool life equation based on the received two sets of history information, and storing the calculated coefficient n and coefficient C along with the information on the tool life influencing factors into the tool information storage.

10. The machining management apparatus according to claim 1, wherein:
the tool information storage is configured to further store therein a correction coefficient for tool life set for each of the cutting tools; and
the remaining life information update part is configured to, in the initial value setting processing, correct the initial value for the cutting tool in accordance with the correction coefficient for the cutting tool obtained by referring to the correction coefficient for the cutting tool stored in the tool information storage.

11. The machining management apparatus according to claim 1, wherein:
the tool information storage is configured to further store therein a correction coefficient for tool life set for each of the cutting tools; and
the remaining life information update part is configured to, in the coefficient recognition processing, recognize a corresponding correction coefficient, and, in the update processing, correct the recognized rate of tool life consumption in accordance with the recognized correction coefficient.

12. The machining management apparatus according to claim 1, wherein the remaining life information update part is configured to make notification to outside when an existence of a cutting tool which has reached an end of its tool life is confirmed.

13. A machining management apparatus comprising:
a tool information storage storing therein information relating to each of cutting tools used in a machine tool, the tool information storage storing therein a coefficient n and a coefficient C in a tool life equation below corresponding to tool life influencing factors including at least a workpiece to be cut and a material of the cutting tool;
an adapted cutting speed calculator executing a machining condition receiving processing of receiving, as freely set machining conditions, information on the tool life influencing factors and information on a desired cutting time, a coefficient recognition processing of recognizing the coefficient n and the coefficient C corresponding to the received tool life influencing factors by referring to the tool information storage based on the received information on the tool life influencing factors, and a cutting speed calculation processing of calculating a cutting speed adapted to the desired cutting time according to the tool life equation below based on the recognized coefficient n and coefficient C:

$$V \cdot T^n = C,$$

where V is a cutting speed, T is a tool life time, and n and C are coefficients;

a tool information generator receiving at least two sets of history information along with information on the tool life influencing factors, the history information being obtained by machining a set workpiece with a set cutting tool and accumulating an information pair containing a cutting speed and a cutting time under the cutting speed until the cutting tool reaches an end of its tool life, calculating the coefficient n and the coefficient C corresponding to the tool life influencing factors according to the tool life equation based on the received two sets of history information, and storing the calculated coefficient n and coefficient C along with the information on the tool life influencing factors into the tool information storage.

14. A machining management apparatus comprising:

a tool information storage storing therein information relating to each of cutting tools used in a machine tool, the tool information storage storing therein a coefficient n and a coefficient C in a tool life equation below corresponding to tool life influencing factors including at least a workpiece to be cut and a material of the cutting tool and additionally including any one of a feed amount of the cutting tool, a width of cut, and a depth of cut;

an adapted cutting speed calculator executing a machining condition receiving processing of receiving, as freely set machining conditions, information on the tool life influencing factors and information on a desired cutting time, a coefficient recognition processing of recognizing the coefficient n and the coefficient C corresponding to the received tool life influencing factors by referring to the tool information storage based on the received information on the tool life influencing factors, and a cutting speed calculation processing of calculating a cutting speed adapted to the desired cutting time according to the tool life equation below based on the recognized coefficient n and coefficient C:

$$V \cdot T^n = C,$$

where V is a cutting speed, T is a tool life time, and n and C are coefficients; and a tool information generator receiving at least two sets of history information along with information on the tool life influencing factors, the history information being obtained by machining a set workpiece with a set cutting tool with a condition set with respect to at least any one of the feed amount of the cutting tool, the width of cut, and the depth of cut, and accumulating an information pair containing a cutting speed and a cutting time under the cutting speed until the cutting tool reaches an end of its tool life, calculating the coefficient n and the coefficient C corresponding to the tool life influencing factors according to the tool life equation based on the received two sets of history information, and storing the calculated coefficient n and coefficient C along with the information on the tool life influencing factors into the tool information storage.

* * * * *